US005752167A

United States Patent [19]

Kitayoshi

[11] Patent Number: 5,752,167

[45] Date of Patent: May 12, 1998

[54] RADIO PROPAGATION SIMULATION METHOD, WAVE FIELD STRENGTH INFERENCE METHOD AND THREE-DIMENSIONAL DELAY SPREAD INFERENCE METHOD

[75] Inventor: Hitoshi Kitayoshi, Sendai, Japan

[73] Assignee: Advantest Corporation, Tokyo, Japan

[21] Appl. No.: 716,289

[22] PCT Filed: Jan. 23, 1996

[86] PCT No.: PCT/JP96/00110

§ 371 Date: Dec. 18, 1996

§ 102(e) Date: Dec. 18, 1996

[87] PCT Pub. No.: WO96/23363

PCT Pub. Date: Aug. 1, 1996

[30] Foreign Application Priority Data

Jan. 23, 1995 [JP] Japan .................................... 7-008495
Jan. 23, 1995 [JP] Japan .................................... 7-008496
Jan. 23, 1995 [JP] Japan .................................... 7-008497

[51] Int. Cl.[6] ...................................................... H04B 17/00

[52] U.S. Cl. .................... 455/67.1; 455/67.6; 455/226.1; 455/65; 455/506; 324/76.21; 324/76.26; 324/617; 375/224

[58] Field of Search .................................... 455/423, 424, 455/425, 501, 504, 506, 63, 65, 67.1, 67.2, 67.3, 67.5, 67.6, 67.7, 226.1, 226.2, 226.3, 226.4, 296; 375/224, 227, 346, 349, 308, 329, 340; 324/613, 615–618, 629–630, 637–638, 76.19, 76.21, 76.24, 76.26, 76.77, 76.33

[56] References Cited

U.S. PATENT DOCUMENTS 5,381,444 1/1995 Tajima .................................. 455/67.1
5,563,909 10/1996 Nakazawa .............................. 395/224
5,656,932 8/1997 Kitayoshi .............................. 324/615

*Primary Examiner*—Reinhard J. Eisenzopf
*Assistant Examiner*—Doris To
*Attorney, Agent, or Firm*—Staas & Halsey

[57] ABSTRACT

Radio waves having frequencies $f_1$ and $f_2$ are radiated to the premises where a wireless LAN is to be constructed. The radio waves of $f_1$ and $f_2$ are received by an antenna for scanning the observation plane and a fixed antenna, respectively. Then, the radio wave holograms of the respective radio waves are produced, from which are constructed radio wave source images separated into respective paths. The difference between these source images is found, and then the amplitude and the delay for each path are found. A propagation time response function x(t) of each path is found from the corresponding amplitude, delay and the directivity characteristics of the corresponding antenna, and then the real part and the imaginary part of each time response function are convoluted into a modulated carrier wave signal y(t). The convoluted results are multiplied by the in-phase component $R_\gamma$ and the quadrature component $R_{\gamma'}$ of an unmodulated carrier wave, respectively. Then, the multiplied results are summed to obtain a demodulated base band signal γ (t). Also, a radio wave delay time of each secondary radio wave source image to the primary wave source is found. The radio wave source image is re-positioned in a three-dimensional absolute coordinate using the radio wave delay time. At an arbitrary position in the absolute coordinate, the radio waves from the respective radio wave source images are composited to find the strength. Also, a mean delay and a standard deviation of the delay are found from the delay times and the strength attenuations in accordance with the distances to each radio wave source image.

12 Claims, 6 Drawing Sheets

RADIO PROPAGATION SIMULATION METHOD, WAVE FIELD STRENGTH INFERENCE METHOD AND THREE-DIMENSIONAL DELAY SPREAD INFERENCE METHOD

TECHNICAL FIELD

The present invention relates to a method of simulating a multi-path propagation of a radio (electromagnetic) wave in premises and street spaces which is required, for example, for practical use of a high speed wireless LAN, and to a method of inferring at various places a strength of a wave which is radiated from a wave source such as a radio wave, an acoustic (sound) wave, or the like, and to a method of inferring a three-dimensional spread of multi-path delay waves.

In order to construct a high speed wireless communication network, it is necessary to accurately know the three-dimensional radio wave propagation environment, i.e., radio wave multi-path propagation, state of frequency selective fading and field strength/delay spread at various places.

A conventional simulation method for multi-path propagation of an in-premise wireless LAN has been a ray-tracing method as shown in J. W. Mcknown and R. L. Hamilton, Jr.: "Ray Tracing as a Design Tool for Radio Networks", IEEE Network Magazine, pp. 27–30, November 1991. In this method, at a certain receiving point, based on the light receiving directions of direct lights and various reflected lights, each transmitting source from where each light reaches the receiving point without reflection is assumed and then, attenuations and delays are obtained from the distances between these transmitting sources and the receiving point and then interferogram states are obtained.

In the ray tracing method, since reflection surfaces are assumed for respective reflections by various objects in the premises, it is difficult to accurately assume each transmitting source for actual complex reflections, and thus, a proper simulation cannot be performed. In addition to the difficulty of accurate assumption of such complex reflection surfaces, the reflection state is different between a metal and a wood. Therefore, it is also difficult to accurately assume the materials of the reflection surfaces. Consequently, the inference error of the delay wave is in the range of 1 ns–100 ps. Because of such reasons, a direct simulation of quality of transmission channels under multi-path fading in high speed data communication has not been possible. That is, in the conventional method, a statistical inference of bit error rate based on the interference simulation and delay spreads for 2–3 waves at the best has only been possible and thus, only exceptional cases could be applied to the actual environment.

Further, a field strength has been measured under a three-dimensional radio propagation environment by placing a receiver at an observation point. As mentioned above, it is necessary to place a receiver every time at each observation point in a direct measuring method. Therefore, this method is time and work load consuming. Also, in this method, it is actually difficult to measure a wide three-dimensional space with short distance intervals.

Delay spread is utilized for evaluation of communication quality. For example, a maximum bit rate for the communication is determined from a delay spread value. In the conventional method, for example, as shown in IEEE Transactions on Antennas and Propagation, Vol. 42, No. 10, October, 1994, PP. 1369–1376 "A New Approach for Estimating Indoor Radio Propagation Characteristics", a radio wave modulated by a PN code is transmitted and the transmitted radio wave is received by a receiver provided at a measuring position and then is measured. Since, in this case, a receiver is also placed at each position to be measured and a direct measurement is performed, a large work load and a long time are necessary. Since a radio wave modulated by PN code is transmitted, a short delay cannot be separated unless the modulation frequency band width is wide enough and thus, the measuring accuracy is low.

It is an object of the present invention to provide a radio propagation simulation method by which a radio propagation can be simulated in a relatively simple arrangement even if many complex reflection objects are placed in a complex manner, and thus even if complicated propagation paths are generated, and even if various objects having various reflection characteristics exist.

It is another object of the present invention to provide a wave field strength measuring method by which a field strength of a wave such as a radio wave or an acoustic wave in a wide three-dimensional space can be measured in short distance intervals and in relatively simple manner.

It is still another object of the present invention to provide a three-dimensional delay spread inference method by which in a wide three-dimensional space, a three-dimensional delay spread of each part can be measured in relatively simple manner and with high accuracy.

DISCLOSURE OF THE INVENTION

In any one of the radio propagation simulation method, the wave field (radio wave) strength inference method and the three-dimensional delay spread inference method of the present invention, a first step for observing two-dimensional interferogram data i.e. hologram of a radio wave in a subject space with at least two frequencies is included.

In the radio propagation simulation method, the amplitude and the delay of the received wave from each propagation path are measured in step 2 based on the observed data in step 1. Then in step 3, a time response function of each propagation path is generated based on the amplitude, the delay and the directivity characteristic of the receiving antenna. Then, in step 4, this propagation path time response function is convoluted into a modulated carrier signal. Then, in step 5, the convoluted result is multiplied by an unmodulated or non-modulated carrier wave to find a receiving base band signal.

In the multiplication of the unmodulated carrier wave signal in step 5, a modulated carrier wave signal into which the real part of the time response function is convoluted is multiplied by the in-phase component of the unmodulated carrier wave signal, a modulated carrier wave signal into which the imaginary part of the time response function is convoluted is multiplied by the quadrature component of the unmodulated carrier wave signal, and then, these multiplied results are summed to obtain the in-phase component of the receiving base band signal.

In step 5 above, it is included that a vector modulated carrier wave signal is used as the modulated carrier wave signal, in the multiplication of the unmodulated carrier wave signal, the modulated carrier wave signal into which the real part of the Hilbert transformed time response function is convoluted is multiplied by the in-phase component of the non-modulated carrier wave signal, the modulated carrier wave signal into which the imaginary part of the time response function is convoluted is multiplied by the quadrature component of the non-modulated carrier wave signal, and then these multiplied results are summed to find the quadrature component of the receiving base band signal.

In the multiplication of the unmodulated carrier wave signal in step 5, a modulated carrier wave signal into which the real part of the time response function is convoluted is multiplied by the in-phase component of the unmodulated carrier wave signal having a frequency less than the unmodulated carrier wave signal by an intermediate frequency, the modulated carrier wave signal into which the imaginary part of the time response function is convoluted is multiplied by the quadrature component of the unmodulated carrier wave signal having a frequency less than the unmodulated carrier wave signal by an intermediate frequency, these multiplied results are summed, the summed result is multiplied by an in-phase component of the intermediate frequency carrier wave signal to find an in-phase component of the receiving base band signal, and the summed result is multiplied by a quadrature component of the intermediate frequency carrier wave signal to find a quadrature component of the receiving base band signal.

The time response function is found as described below. A frequency selective fading characteristic is obtained from the amplitude and the delay of each received wave and the antenna directivity characteristic. The fading characteristic is then obtained by an inverse Fourier transformation under the limitation of positive frequency range corresponding to the propagation frequency band. The calculation interval for the convolution calculation is made relatively large.

The time response function is found as an impulse response in which the amplitude and the delay of each received wave and the antenna directivity characteristic are superposed. In this case, the difference between the time when the time response function has a value and the calculation timing is found. Then the convolution calculation is performed by shifting the phase of the time response function by the difference value.

In the wave field strength inference method of the present invention, the step 1 uses a radio wave or an acoustic wave etc. in accordance with the subject wave. The hologram is measured at a position where the primary wave source can be viewed from and where the wave space to be inferred can be looked out in the subject space. Further, in this wave field strength inference method, a wave source image is reconstructed in step 2 using the two-dimensional interferogram data (hologram) measured in step 1. That is, a direction and a strength of each wave source image viewed from the observation plane are obtained. Then in step 3, a propagation delay time of each reconstructed wave source image for the primary wave source is obtained from the phase of the wave source. Then in step 4, each wave source is re-positioned in a three-dimensional space using the reconstructed wave source image, the propagation delay time and the phase of the wave source observed by the frequency for the inference. Then in step 5, the wave field strength at the observation point is inferred by re-radiating the waves from the re-positioned wave sources and compositing them.

In the three-dimensional delay spread inference method of the present invention, in step 1, a two-dimensional interferogram data (hologram) is measured at a position where the primary wave source can be viewed from and where the electro-magnetic wave space to be inferred can be looked out. Then in step 2, wave source images are reconstructed using the measured two-dimensional interferogram data (hologram). Then in step 3, a propagation delay time of the reconstructed wave source image for the primary wave source is obtained from the phase of the wave source. Then in step 4, each wave source is re-positioned in a three-dimensional space using the reconstructed wave source image, the propagation delay time and the phase of the wave source observed by the frequency for the inference. Then in step 5, the delay time and the strength attenuation amount in accordance with the distance between the receiving point to be evaluated and each re-positioned wave source are obtained. Then in step 6, the delay mean value and the delay spread value are calculated from the delay time and the strength attenuation amount.

BEST MODES FOR CARRYING OUT THE INVENTION

Figure 1:
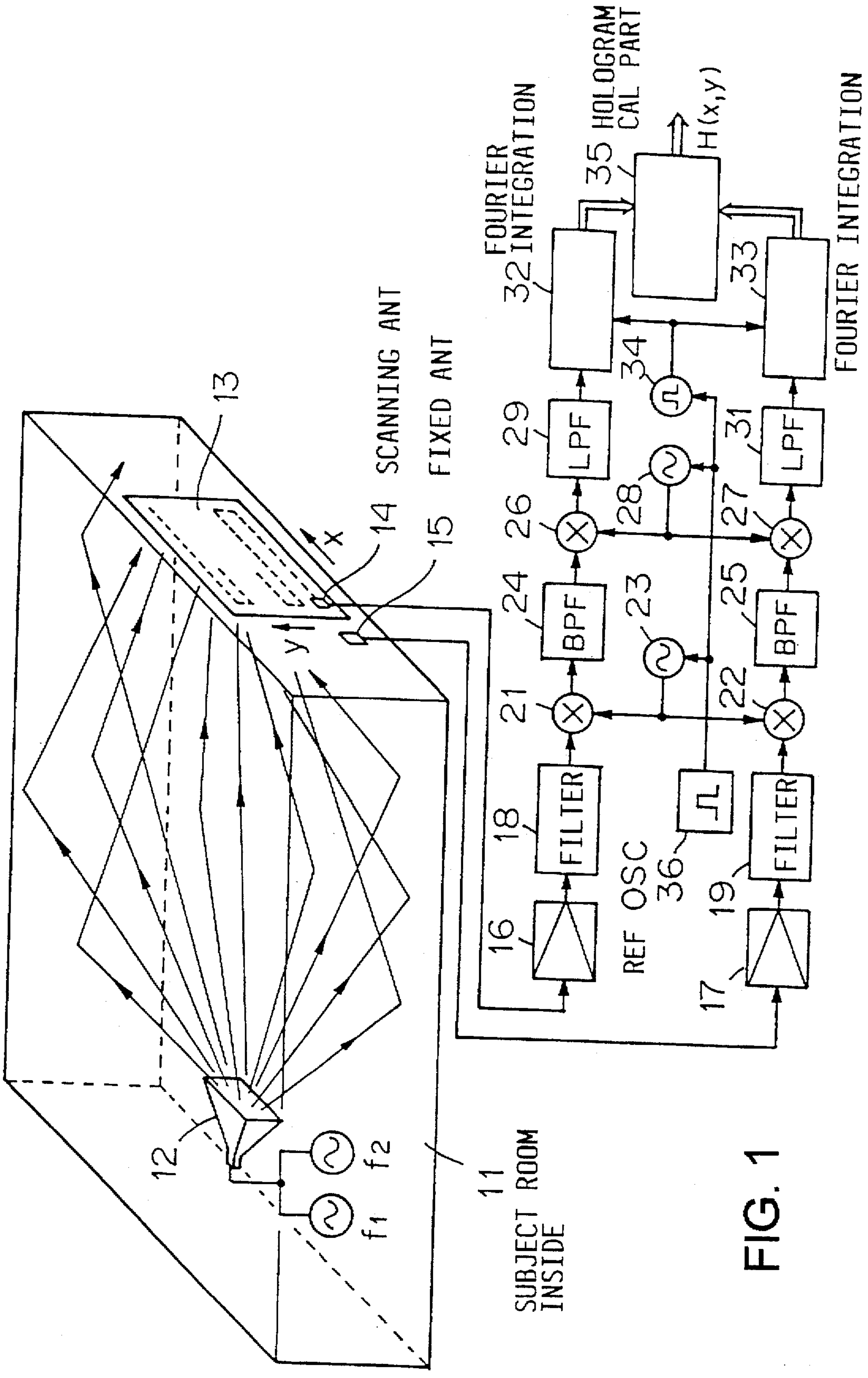
FIG. 1 is a block diagram showing an arrangement example for measuring two-dimensional interferogram data of waves with respect to a plurality of frequencies in the method of the present invention.

Embodiments of the present invention will be now described in detail with reference to the accompanying drawings. First, an embodiment of the radio propagation simulation method will be described. For example, in the case of a simulation of radio propagation in a rectangular parallelepiped space 11, e.g., a large plant, in the present invention, the subject space 11 is observed by dual frequency radio wave hologram (interferogram), i.e., a radio wave hologram of frequency $f_1$ and a radio wave hologram of frequency $f_2$, to measure an amplitude and a delay of a received wave from each propagation path. The dual frequency radio wave hologram is described, for example, in H. Kitayoshi et al., "Two-tone CW Complex Holographic Radar Imaging", IEEE AP-S International Symposium Digest, Vol. 3, pp. 1914–1917, June 1993, or H. Kitayoshi "Imaging of Multipath Radio Propagation for 18 GHz Band Wireless LAN System: Applied Radio Holography", IEEE VTC Proceedings, Vol. 2, pp 896–900, June 1994. As understood from the descriptions of the above literatures, a radio wave of frequency $f_1$ and a radio wave of frequency $f_2$ are radiated from a radiator 12 at a position of a transmission source in the subject space 11. An observation plane 13 is placed at an arbitrary receiving point. A scanning antenna 14 is sequentially placed at various points on the observation plane to receive the radio waves. In addition, the radio waves are also received by a fixed antenna 15 provided at a position relatively close to the observation plane 13. Antennas 14 and 15 are the antennas for receiving the radio waves in the same polarization direction as that of the radio waves radiated from the radiator 12. Receiving outputs of the antennas 14 and 15 are passed through pre-amplifiers 16 and 17 respectively. Then unnecessary waves of the receiving outputs are removed in filters 18 and 19 respectively. Then the filter outputs are frequency mixed with a local signal from a local oscillator 23 in frequency mixers 21 and 22 respectively. Each frequency difference component in the frequency mixed outputs (for example, 21.4 MHz component) is taken out by the respective band-pass filters 24 and 25. Those frequency difference components are further frequency mixed with a local signal (for example, 22.4 MHz signal) of a local oscillator 28 in frequency mixers 26 and 27 respectively. Each frequency difference component in the frequency mixed outputs (for example, 1 MHz component) is taken out by the respective low pass filters 29 and 31. The outputs of the filters 29 and 31 are supplied to Fourier integrators 32 and 33 and then sampled respectively by pulses (for example, 10.24 MHz pulses) from an oscillator 34. Each sampled value is converted into a digital signal and then is discrete Fourier integrated. In a hologram calculation part 35, a hologram calculation of the following equation (1) based on the output $S_r$ of the Fourier integrator 33 as a reference is applied to the Fourier integration result $S_m(x,y)$ of the Fourier integrator 32 to obtain an interferogram data.

$$H(x,y)=(S_m(x,y)/S_r)\cdot|S_r| \quad (1)$$

Where x and y represent each point of the orthogonal coordinate on the observation plane 13. Oscillators 23, 28 and 34 are synchronized with a stable reference signal (for example, 10 MHz signal) from a reference oscillator 36. A complex hologram (two-dimensional interferogram data) at a time when a radio wave of frequency $f_1$ is received and a complex hologram at a time when a radio wave of frequency $f_2$ is received are measured by adjusting the frequency of the local oscillator 23. The size of the observation plane 13 is, for example, 28×28 $cm^2$ and the moving pitches of the scanning antenna 14 in the x and y directions are, for example, 0.45 cm, respectively.

H(x,y) has obtained an amplitude and a phase of the received signal at each point on the observation plane 13 based on the received wave of the fixed antenna 15 as a reference. Two-dimensional Fourier integration of H(x,y) is;

$$I(\xi,\eta)exp\{j\theta(\xi,\eta)\}=K^{-1}(\xi,\eta,z)\iint H(x,y)exp\{-j2\pi(\xi x+\eta y)\}dxdy \quad (2)$$

where z is distance on z axis perpendicular to the observation plane 13 from the observation plane 13, $\xi$ is an azimuth angle to z axis and $\eta$ is an elevation angle to z axis.

This $I(\xi,\eta)$ provides an amplitude and a phase for each direction viewed from the observation plane 13 and thus provides a reconstruction of radio wave source images. Conventionally, $K^{-1}(\xi,\eta,z)$ is used as a mere constant. However, if this is differentiated by frequency as shown in the following equation (3), distance information can be obtained.

$$d[K^{-1}(\xi,\eta,z)]/\text{phase}/d\omega=\{z+(\xi^2+\eta^2)/2\,z\}/c=Y/c \quad (3)$$

$$\omega=2\pi c/\lambda$$

That is, making the difference between the frequencies $f_1$ and $f_2$ small, the difference between respective values of $K^{-1}(\xi,\eta,z)$ for radio waves of $f_1$ frequency and $f_2$ frequency is obtained. When this difference is divided by $(f_1-f_2)$, then a value approximately equal to the differentiated value of the equation (3) is obtained. That is, a delay time that the distance Y is divided by light velocity can be obtained. In such a way, an amplitude and a delay of a received wave from each direction $(\xi,\eta)$ are obtained at the receiving point (x,y). For example, the frequency $f_1$ is 18817 MHz and the frequency $f_2$ is 18814 MHz.

A frequency selective fading characteristic X(f) can be obtained by the following equation (4) from the amplitude $a(\xi,\eta)$ and the delay $d(\xi,\eta)$ of the received wave from each direction $(\xi,\eta)$ thus measured at the observation point (x,y) and the directivity characteristic $g(\xi,\eta)$ (in the case of non-directivity, the same directional characteristic value for each direction $(\xi,\eta)$ is used) of the antenna to be used.

$$X(f)=\iint g(\xi,\eta)\cdot a(\xi,\eta)\cdot exp\{-j2\pi f d(\xi,\eta)\}d\xi d\eta \quad (4)$$

When a carrier wave signal (a signal of frequency $f_c$) having a modulating signal of frequency band $\Delta f$ is propagated through the resultant propagation path from respective directions having this characteristic X(f), the complex time response x(t) is obtained by an inverse Fourier transform of the fading characteristic X(f) for only positive frequencies using a specific frequency band $(f_c \pm k\Delta f)$ as shown in the following equation (5).

$$X(t)=\int X(f)\exp(j2\pi ft)df \quad (5)$$

Where the integration ($\int$) is from $(f_c-k\Delta f)$ to $(f_c+k\Delta f)$, and $k>>1.0$.

Figures 2A, 2B, 2C:
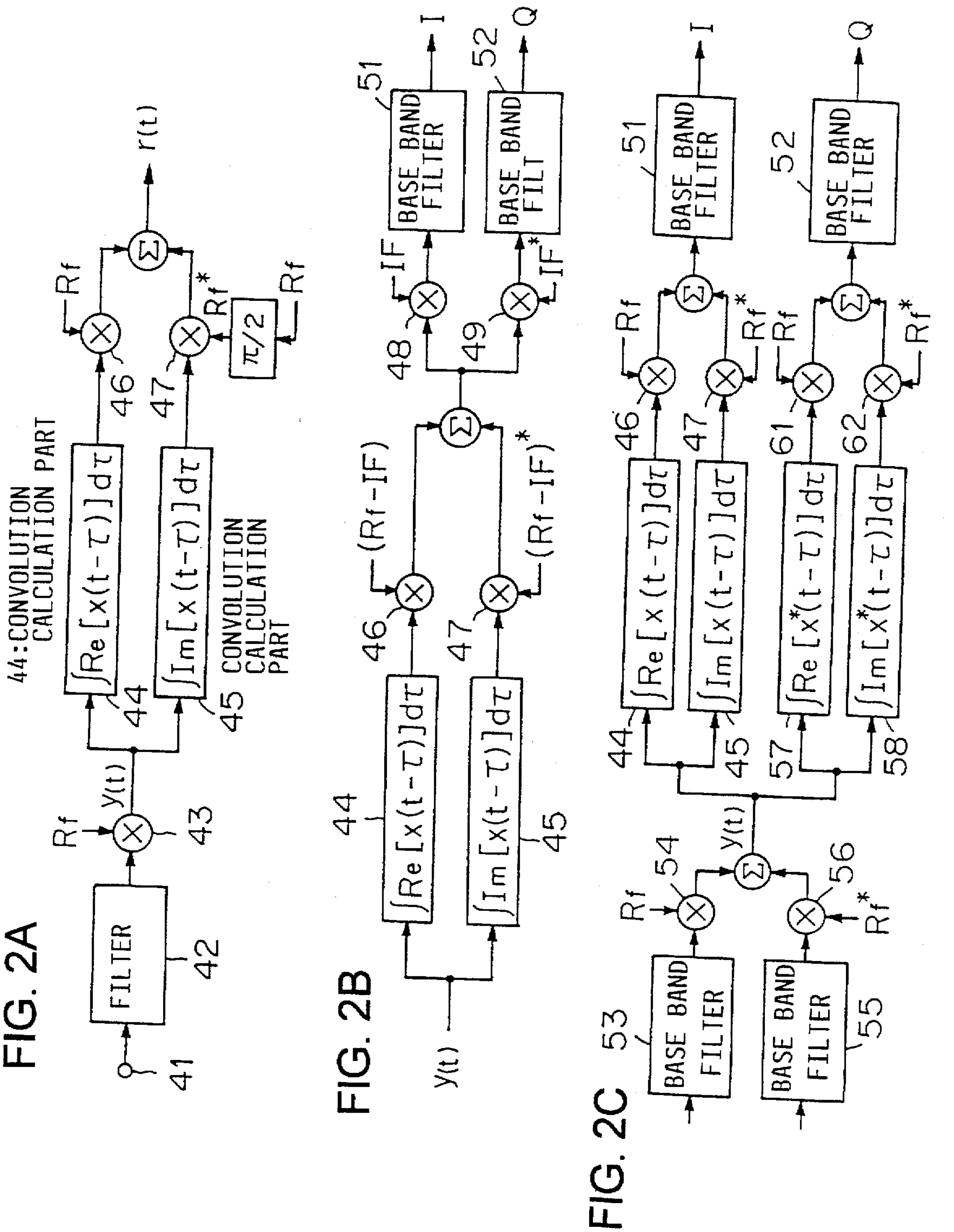
FIG. 2A is a block diagram showing the generation of a modulated carrier wave signal, a signal that the modulated carrier wave signal has received a fading and a base band signal from these signals in the propagation simulation method of the present invention.
FIG. 2B is a block diagram showing each process for generating a signal that the modulated carrier wave signal has received a fading and an influence of a receiver characteristic of up to an intermediate frequency, and then for obtaining a base band signal.
FIG. 2C is a block diagram showing generation of an orthogonally modulated carrier wave signal, a signal that the orthogonally modulated carrier wave signal has received a fading and its base band demodulated output.

The reason for multiplying $\Delta f$ by k is for obtaining the time response including a little outside of the communication band width. This time response is convoluted into the modulated carrier wave signal. Then, the convoluted result is multiplied by the non-modulated carrier wave signal to obtain the demodulated base band signal. For example, as shown in FIG. 2A, a base band modulated signal is passed through a filter 42 from an input terminal 41 to limit the frequency band. Then the filter output is multiplied by a carrier wave signal $R_f$ in a multiplier 43 to obtain a modulated carrier wave signal y(t). Then the time response, i.e., the real part $R_e[x(t)]$ and the imaginary part $I_m[x(t)]$ are convoluted into the y(t) in convolution calculation parts 44 and 45 respectively. That is, the following equations (6) and (7) are calculated.

$$\int y(t)\cdot R_e[x(t-\tau)]d\tau \quad (6)$$

$$\int y(t)\cdot I_m[x(t-\tau)]d\tau \quad (7)$$

From the calculations of the equations (6) and (7), the signal is obtained when the y(t) is propagated through the multipath transmission channels determined by the $a(\xi,\eta)$, $d(\xi,\eta)$, and $g(\xi,\eta)$. Thus obtained signals y(t) having received the fading, i.e., calculation results of the calculation parts 44 and 45 are multiplied by an in-phase component $R_f$ of an unmodulated carrier wave and its quadrature component $R_{f'}$ in multipliers 46 and 47, respectively, and then the multiplied results are summed to find a demodulated base band signal $R_e[Y(t)]$ of a receiver. This $R_e[\gamma(t)]$ is represented by the following equation (8).

$$R_e[\gamma(t)]=\int\{y(t)\cdot R_e[x(t-\tau)]\cos(2\pi f_c t) + y(t)\cdot I_m[x(t-\tau)]\sin(2\pi f_c t)\}d\tau \quad (8)$$

The fading influence of the propagation path can be known from this base band signal $\gamma(t)$. That is, by such calculations, a radio wave propagation in the subject space 11 of FIG. 1 can be simulated and also, the influence to the propagating signal under multi-path fading can be simulated for various base band signals (signals at the input terminal 41) and the carrier wave signal $R_f$. FIG. 2A shows a transmission simulation for BPSK modulated signal and only the real part of the base band signal γ (t) may be processed.

As shown in FIG. 2B, the real part $R_e[x(t)]$ and the imaginary part $I_m[x(t)]$ of the propagation path time response are convoluted into the modulated carrier wave signal y(t) which is the output of the multiplier 43 in FIG. 2A, respectively, in the convolution calculation parts 44 and 45. These convolution calculation results are multiplied by an in-phase component and a quadrature component of a signal having a frequency less than the unmodulated carrier wave signal frequency by the intermediate frequency IF in the multipliers 46 and 47, respectively, and then those multiplied results are summed. This summed result corresponds to the intermediate frequency output signal of the receiver. Therefore, the propagation characteristic including the receiver influence can also be simulated by multiplying this summed result by an in-phase component and a quadrature component of the intermediate frequency signal in the multipliers 48 and 49, respectively, and by passing the multiplied results through base band filters 51 and 52, respectively, to obtain an in-phase component I and a quadrature component Q of the modulated base band signal. This simulation is also one for BPSK modulated signal.

In the case where a base band signal has a quadrature component Q in addition to an in-phase component I as in QPSK modulated signal, as shown in FIG. 2C where the same reference symbols are assigned to the portions corresponding to those in FIG. 2A, the in-phase component I of a modulated signal from an input terminal $41_I$, is passed through a base band filter 53 and then is multiplied by an in-phase component of a carrier wave signal $R_f$ in a multiplier 54, the quadrature component Q of the modulated signal from an input terminal $41_Q$ is passed through a base band filter 55 and then is multiplied by a quadrature component $R_{f'}$ in a multiplier 56, and then the multiplied results of the multipliers 54 and 56 are summed to obtain a vector modulated carrier wave signal y(t). This y(t) is supplied to convolution calculation parts 44 and 45, and in convolution calculation parts 57 and 58, the functions that the time response functions x(t) are Hilbert transformed i.e., $R_e[x(t-\tau)]$ and $I_m[x^*(t-\tau)]$ are respectively convoluted into y(t). The calculation results in the convolution calculation parts 57 and 58 are multiplied, respectively, by an in-phase component $R_f$ and a quadrature component $R_{f'}$ of a non-modulated carrier wave signal in multipliers 61 and 62. These multiplied results are summed and then the summed result is supplied to a base band filter 52 to obtain a signal corresponding to a quadrature component Q of a demodulated base band signal of a receiver. The multiplied results in the multipliers 46 and 47 are summed and then the summed result is passed through a base band filter 51 to obtain a signal corresponding to an in-phase component I of the demodulated base band signal of the receiver. Further, the input of a base band filter 52 is represented by the following equation (9);

$$I_m[\gamma(t)]=\int\{y(t)\cdot R_e[x^*(t-\tau)]\cos(2\pi f_c t)+y(t)\cdot I_m[x^*(t-\tau)]\sin(2\pi f_c t)\}d\tau \quad (9)$$

where $x^*(t)$ is a function that x(t) is Hilbert transformed. That is, this function is expressed as follows:

$$x^*(t)=\int\{-I_m[X(f)]+jR_e[X(f)]\}exp(j2\pi ft)df \quad (10)$$

where the integration (∫) is from $(f_c-k\Delta f)$ to $(f_c+k\Delta f)$.

In the equation of $I_m[\gamma(t)]$, the convolution calculation of first term is performed in the calculation part 57 except for the multiplication of cos $(2\pi f_c t)$ of the right side and the convolution calculation of second term is performed in the calculation part 58 except for the multiplication of sin $(2\pi f_c t)$. In such a way, a signal that a carrier wave is modulated by a base band signal comprising signals I and Q at the input terminals $41_I$–$41_Q$ can respectively simulate I and Q components of a demodulated base band of a transmission signal having been influenced by multi-path fading. In the calculation for convoluting the time response function x(t) into y(t), the shorter the calculation period (sampling period) is, the higher the accuracy becomes. However, shorter calculation period will result in significantly large calculation volume.

In the above, a carrier wave frequency used in the simulation of calculation has been caused to correspond to a carrier wave frequency actually used by defining as follows:

$$R_f=\cos(2\pi f_c t)$$

$$R_{f'}=\sin(2\pi f_c t)$$

where $f_c$ is an actual carrier wave frequency.

However, if $f_c'$, that is, a frequency lower than $f_c$ by $f_0$ $$f_c'=f_c-f_0$$

is used in place of $f_c$ and the equation (5) is expressed as follows;

$$x(t)=\int X(f+f_0)exp(j2\pi ft)df \quad (5)'$$

where the integration (∫) is from $(f_c'-k\Delta f)$ to $(f_c'+k\Delta f)$, and $k>>1.0$, then the carrier wave frequency $f_c'$ used in the simulation of calculation can be set to a frequency lower than the actual carrier frequency $f_c$. That is, the following equations are given.

$$R_f=\cos(2\pi f_c' t)$$

$$R_{f'}=\sin(2\pi f_c' t)$$

By this process, a quickly changing modulated wave signal can be converted to relatively low frequency signal, and consequently, a relatively faithful simulation of propagation signal wave form can be performed by a slow sampling frequency (relatively long calculation time interval), i.e., less calculation volume. However, when the frequency band of the modulated carrier wave signal is wider as in CDMA (code division multi-access), the frequency band cannot be limited.

In this case, the calculation volume could be reduced as described below.

An impulse response is obtained by the following equation (11) as a time response function x(t) of a propagation path.

$$x(t)=\iint g(\xi,\eta)\cdot a(\xi,\eta)\cdot\delta\{t-d(\xi,\eta)\}d\xi d\eta \quad (11)$$

δ (u) is a delta function and the value thereof is 1 when u is equal to 0 (u=0), and is 0 when u is not equal to 0 (u≠0). That is, x(t) is obtained as an impulse response superposing g(ξ, η), a(ξ, η) and d(ξ, η).

In order to convolute x(t) into y(t), the following calculation is performed by sampling (time quantization) y(t) and x (t) with a time interval Δt.

$$\gamma(n\Delta t)=\Sigma y(n\Delta t)\cdot x(n\Delta t-k\Delta t) \quad (12)$$

Figure 3:
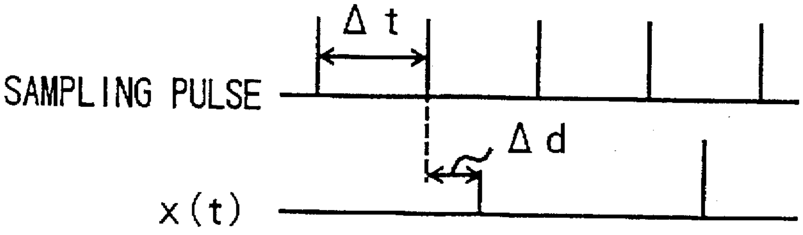
FIG. 3 shows an example of a relationship between a sampling pulse and a time response function.

Σ is performed on k and the range of k is all the observation time range. $\gamma(n\Delta t)$ of the equation (12) is a received signal of a modulated carrier wave signal. When the equation (11) is sampled at $\Delta t$ interval, x(t) has a value only when δ function is 1, i.e., $t=d(\xi, \eta)$. Therefore, as shown in FIG. 3, a difference Δd between a sampling pulse and a time point when x(t) has a value is Δt/2 at the maximum. That is, with respect to this maximum time error Δt/2, a phase error of πfΔ (rad) is produced to the component of frequency f. Therefore, the equation (11) is developed or expanded in complex number using the carrier frequency $f_c$ as a center. That is, the phase is added to the time response function x(t). Assuming the delay d of a propagation path is nΔt+Δd (d=nΔt+Δd), the following equation (13) is calculated and then the result of the equation (13) is used in the calculation of the equation (12).

$$x(n\Delta t)=x(t)\exp(-j2\pi f_c\Delta d) \quad (13)$$

With such calculation, the phase error based on the sampling of Δt interval is compensated by the phase term $\exp(-j2\pi f_c\Delta d)$ of the equation (13). Consequently, the sampling interval Δt can be increased and thus the calculation volume can be reduced.

Further, when the carrier frequency $f_c$ of y(t) is shifted by Δf by the modulating signal, the real time expression of the phase error in x(nΔt) is;

$$\theta_e=2\pi\Delta d(f_c+\Delta f)[rad]$$

and the complex expanded expression is as follows:

$$\theta_e'=2\pi\Delta d\Delta f[rad]$$

Since $f_c+\Delta f>>\Delta f$, *on comparison of* $\theta_e$ with $\theta_e'$, it is understood that the complex expanded expression can simulate accurately.

The impulse response is obtained by the equation (11) and then the radio propagation simulation can be performed using the time response function x(t) as shown in FIGS. 2A, 2B or 2C. In this case, the time response function x(t) can be converted like the equation (13) to reduce the calculation volume.

Figure 4:
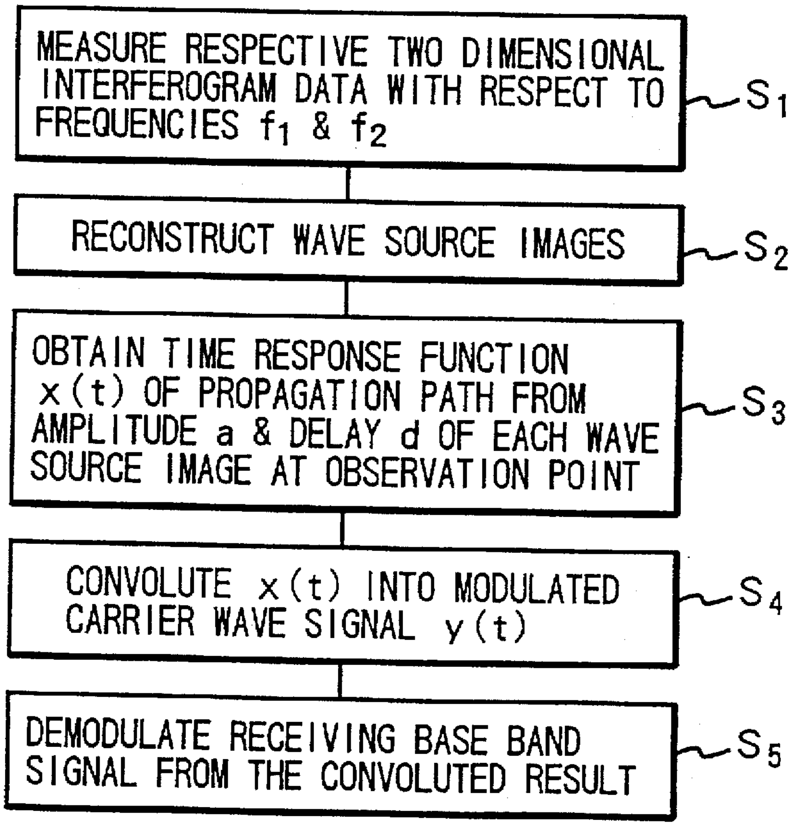
FIG. 4 is a flow chart showing an example of the process sequence in the radio propagation simulation method of the present invention.

FIG. 4 shows a process sequence in the aforementioned radio propagation simulation method of the present invention. That is, two-dimensional interferogram data in a subject space are measured with respect to frequencies $f_1$ and $f_2$ respectively (step $S_1$). Then, a radio wave source image is reconstructed from each interferogram data (step $S_2$). Then a time response function x(t) of the propagation path is obtained based on an amplitude $a(\xi, \eta)$ and a delay $d(\xi, \eta)$ of the radio wave at an observation point from each reconstructed wave source image and a directivity characteristic $g(\xi, \eta)$ of the used receiving antenna (step $S_3$). In order to obtain this x(t), two methods are available one of which is an inverse Fourier transform of the equation (4) (the equation (5)) and the other is use of the equation (11). Then, the obtained x(t) is convoluted into a modulated carrier wave signal y(t) (step $S_4$). For this convolution process, as explained for the equation (5)', when the process is performed with a carrier frequency less than the actual frequency value, the equations (12) and (13) may be used. Then, the convoluted result is demodulated to the base band signal (step $S_5$). In this case, the base band signal may be obtained immediately by detecting the carrier wave of the convoluted result, or the base band signal may be obtained, after the intermediate frequency conversion, by detecting the intermediate frequency.

Then, an embodiment where the wave field strength inference method of the present invention is applied to an electro-magnetic field strength inference will be explained. In this embodiment, two-dimensional interferogram data of the electromagnetic waves are measured using at least two frequencies at the position where the primary wave source can be viewed from and where the electro-magnetic field space to be inferred can be looked out. For example, in FIG. 1, a radiator 12 for radiating a radio wave of frequency $f_1$ and a radio wave of frequency $f_2$ as a primary wave source in the subject space 11 is used. An observation plane 13 is placed at the position where the radiator 12 can be viewed from and where the electromagnetic field space to be inferred can be looked out. The two-dimensional interferogram data (complex hologram) measurement after that is the same as that described above. That is, a complex hologram H(x,y) can be obtained from a hologram calculation part 35. Then, as in the previous case, this H(x,y) is two-dimensional Fourier integrated to reconstruct the radio wave source image. In this embodiment, each propagation delay time of the wave from the radiator 12 which is a primary wave source of the reconstructed wave source image is obtained from the phase of the wave source. That is, assuming that the position of the radiator 12 which is a primary wave source is $(\xi_0, \eta_0)$, the distance between the radiator 12 and the observation plane is $\gamma_0$, the light velocity is c, $\omega_1=2\pi f_1$, and $\omega_2=2\pi f_2$, then the reconstructed wave source image, i.e., the propagation delay time $D(\xi, \eta)$ between the secondary wave source and the primary wave source viewed from the observation plane is obtained by the following equation (15).

$$D(\xi,\eta)=\gamma_0/c+\{[\theta(\xi,\eta,\omega_1)-\theta(\xi_0,\eta_0,\omega_1)]-[\theta(\xi,\eta,\omega_2)-\theta(\xi_0,\eta_0,\omega_2)]\} \quad (15)$$

Then, each wave source is re-positioned in a three-dimensional space using the reconstructed wave source image $I(\xi, \eta)\exp\{j\theta(\xi, \eta)\}$, the propagation delay time $D(\xi, \eta)$ and the phase of the wave source observed by the frequency to be inferred $2\pi f=\omega$. That is, the absolute coordinate (X, Y, Z) of each wave source is given by the following equations (16), (17) and (18) assuming $Y(\xi, \eta)=D(\xi, \eta)\cdot c$.

$$X(\xi,\eta)=\gamma(\xi,\eta)\cdot\xi\cdot\cos[\sin^{-1}(\eta)] \quad (16)$$

$$Y(\xi,\eta)=\gamma(\xi,\eta)\cdot\eta\cos[\sin^{-1}(\xi)] \quad (17)$$

$$Z(\xi,\eta)=\sqrt{\gamma(\xi,\eta)^2-X(\xi,\eta)^2-Y(\xi,\eta)^2} \quad (18)$$

At this time, the radiation strength $I'(\xi\eta\omega)$ and the phase $\theta'(\xi\eta\omega)$ of each wave source are given by the following equations (19) and (20) where λ is the wave length.

$$I'(\xi,\eta\omega)=\gamma(\xi,\eta)\cdot I(\xi,\eta,\omega) \quad (19)$$

$$\theta'(\xi,\eta,\omega)=\theta(\xi,\eta,\omega)+2\pi\gamma(\xi,\eta)/\lambda \quad (20)$$

The wave source given by the equations (19) and (20) exists on each position in the three-dimensional space determined by the reconstructed image coordinate $(\xi, \eta)$, namely, on the coordinate X, Y, Z given by the equations (16), (17) and (18).

Therefore, the complex electric field $E(x',y',z',\omega)$ including the electric field strength and the phase at an arbitrary position of the three-dimensional space viewed from the hologram observation plane is inferred by the following equation (21) which composites the waves from all the wave sources including the primary wave source.

$$E(x',y',z',\omega)=\Sigma\Sigma\{1/\gamma(\xi,\eta)\}I'(\xi,\eta,\omega)\exp[j\{\theta'(\xi,\eta,\omega)-2\pi\gamma(\xi,\eta)/\lambda\}] \quad (21)$$

Where the summation ΣΣ is the grand total of each of ξ and η.

γ'(ξ, η) is a distance from a position (x',y',z') to each wave source and is expressed by the following equation (22).

$$\gamma'(\xi,\eta)=\sqrt{[X(\xi,\eta)-x']^2+[Y(\xi,\eta)-y']^2+[Z(\xi,\eta)-z']^2} \quad (22)$$

Figure 5:
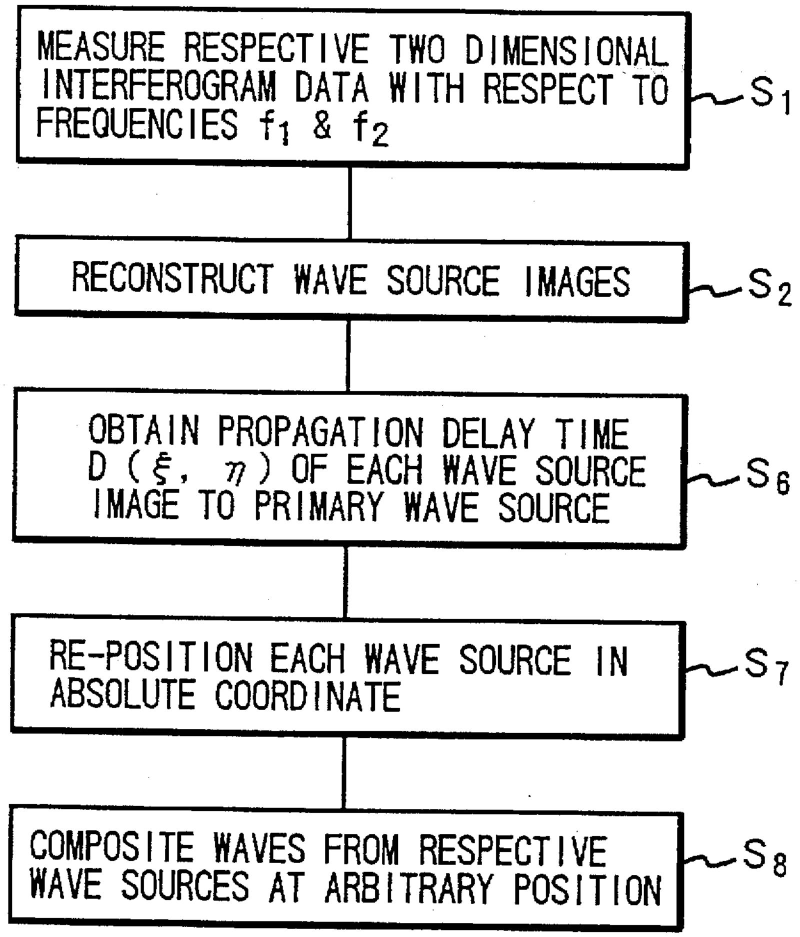
FIG. 5 is a flow chart showing an example of the process sequence in the wave field strength measuring method of the present invention.

FIG. 5 briefly shows the above process steps. That is, the process steps $S_1$ and $S_2$ in FIG. 4 are similarly performed to reconstruct the wave source images. Then in this embodiment, a propagation delay time D(ξ, η) of each wave source image to the primary wave source 12 is obtained by the equation (15) (step $S_6$). Then, each wave source is re-positioned to an absolute coordinate (X,Y,Z) (step $S_7$). The electric field strength and the phase at an arbitrary position in the absolute coordinate are composited by the equation (21) with respect to the electro-magnetic wave from the re-positioned wave source (step $S_8$).

Next, an embodiment for three-dimensional delay spread inference method of the present invention will be explained. In this case, similarly to the embodiment of the electro-magnetic field strength inference method, a radiator 12 for radiating a radio wave of frequency $f_1$ and a radio wave of frequency $f_2$ as the primary wave source is used in FIG. 1. An observation plane 13 is positioned at a position where the radiator can be viewed from and where the electro-magnetic field space to be inferred can be looked out. Each two-dimensional interferogram data H(x,y) of radio waves of frequencies $f_1$ and $f_2$ is obtained and then the radio wave source image is reconstructed. Then, each propagation delay time D(ξ, η) of the reconstructed secondary wave source image to the radio wave of the primary wave source is obtained. Then, each wave source is re-positioned to an absolute coordinate (X,Y,Z) using this D(ξ, η), the reconstructed wave source image I(ξ, η)exp{jθ(ξ, η)} and the phase of the wave source observed by a frequency f to be inferred. At this time, the wave source position is given by the equations (16)–(18) and the radiation strength of the wave source Γ'(ξ, η, ω) and the phase θ'(ξ, η, ω) are given by the equations (19) and (20), respectively.

A mean delay value m and a standard deviation $\tau_{rms}$ of the delay of a radio wave from each wave source at an arbitrary position (x',y',z') in a three-dimensional space (X,Y,Z) are obtained, respectively, by the following equation (23) and (24) based on the delay time γ'(ξ, η)/c and the strength $\{\Gamma'(\xi, \eta, \omega)/\gamma(\xi, \eta)\}^2$ in accordance with the distance γ'(ξ, η) between the position (x',y',z') and each wave source.

$$\tau_m=\Sigma\Sigma[1/\{c\cdot\gamma'(\xi,\eta)\}]\cdot\{I'(\xi,\eta,\omega)\}^2/\Sigma\Sigma[\{1/\gamma'(\xi,\eta)\}\cdot I'(\xi,\eta,\omega)]^2 \quad (23)$$

$$\tau_{rms}=\sqrt{\frac{\Sigma\Sigma\left\{\frac{\gamma'(\xi,\eta)}{c}-\tau_m\right\}^2\left\{\frac{1}{\gamma'(\xi\eta)}\cdot I'(\xi,\eta,\omega)\right\}^2}{\Sigma\Sigma\left\{\frac{1}{\gamma'(\xi\eta)}\cdot I'(\xi,\eta,\omega)\right\}^2}} \quad (24)$$

In the above equations (23) and (24), the summation ΣΣ is the addition performed with respect to values of each of ξ and η, and γ '(ξ, η) is obtained by the equation (22).

In such a way, the mean delay value $\tau_m$ and the standard deviation $\tau_{rms}$ of the delay at the arbitrary position (x', y',z') in the three-dimensional space viewed from the hologram observation plane 13 are obtained by calculating the equations (23) and (24), respectively. Further, a delay wave spread amount is a squared value of the value $\tau_{rms}$ obtained by the equation (24). However, the value $\tau_{rms}$ of the equation (24) may sometimes be referred to as the delay spread.

A usual radio wave communication is performed using a finite frequency band. Therefore, in the finite frequency band range of ω±Δω, the variations of strength Γ (ξ,η,ω) and phase θ' (ξ,η,ω) of each wave source are considered to be small. When the strength is Γ'(ξ,η), and the phase is θ'(ξ,η), and the antenna directivity is A(ξ,η), the frequency response of a propagation path at an arbitrary position (x',y',z') can be obtained by the following equation (25).

$$G(\omega)=\Sigma\Sigma\{A(\xi,\eta)/\gamma'(\xi,\eta)\}\cdot I'(\xi,\eta)\cdot exp[j\{\theta'(\xi,\eta)-\gamma'(\xi,\eta)\cdot\omega/c\}] \quad (25)$$

In addition, when a frequency band limitation function is B(ω), the time response function g(t) of the propagation path can be expressed by the following equation (26);

$$g(t)=\int G(\omega)\cdot B(\omega)\cdot exp(j\omega t)d\omega \quad (26)$$

where the integration ∫ is the integration of the limited frequency range.

The mean delay $\tau_m$ and the standard deviation of delay $\tau_{rms}$ at an arbitrary position are obtained by the following equations (27) and (28), respectively, from this time response function.

$$\tau_m=\int t\cdot|g(t)|^2dt/\int|g(t)|^2dt \quad (27)$$

$$\tau_{rms}=\sqrt{\frac{\int(t-\tau_m)^2|g(t)|^2dt}{\int|g(t)|^2dt}+\{Z(\xi,\eta)-z'\}^2} \quad (28)$$

Figure 6:
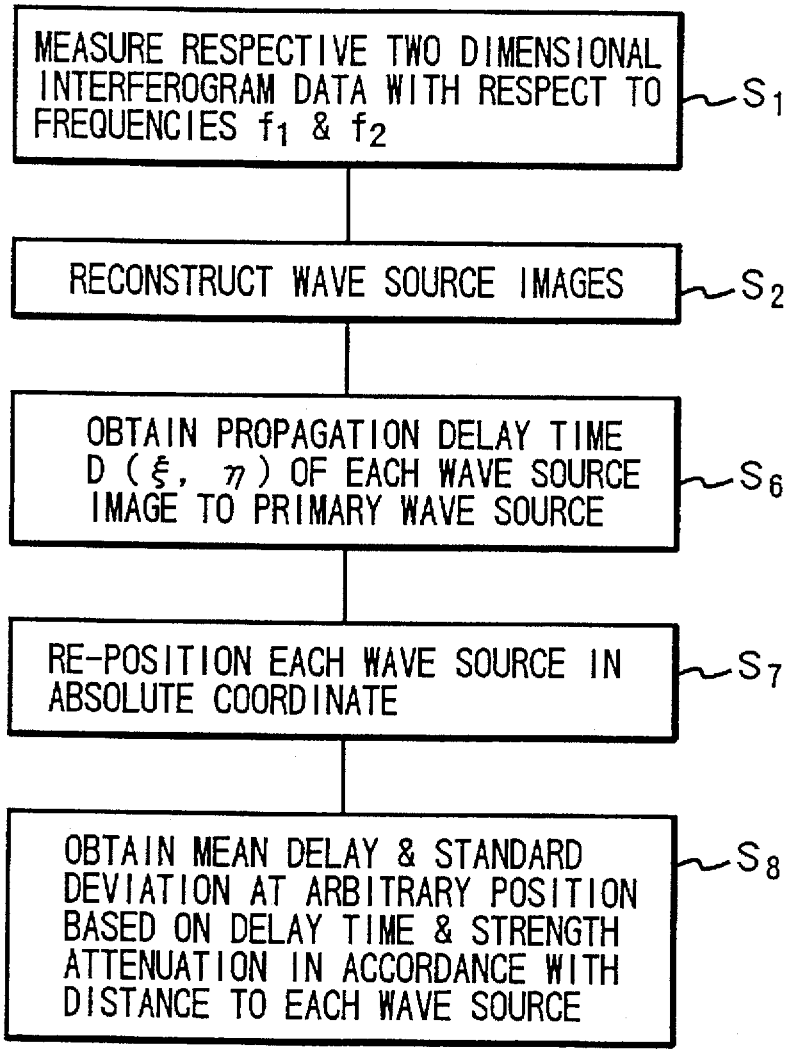
FIG. 6 is a flow chart showing an example of the process sequence in the three-dimensional delay spread measuring method.

FIG. 6 shows a process sequence for inferring $\tau_{m\ and\ \tau rms}$. As shown in FIG. 6 and as apparent from the aforementioned description, the process up to the re-positioning of each wave source to an absolute coordinate is the same as that in the embodiment of the electro-magnetic field strength inference method. That is, the process of the steps $S_1$, $S_2$, $S_6$ and $S_7$ is performed and then, the mean delay $\tau_m$ is obtained by the equation (23) or (27) and the standard deviation $\tau_{rms}$ is obtained at an arbitrary position (x', y',z') by the equation (24) or (28) from the delay time and the strength in accordance with the distance γ'(ξ,η) from each wave source (step $S_8$).

Figure 7:
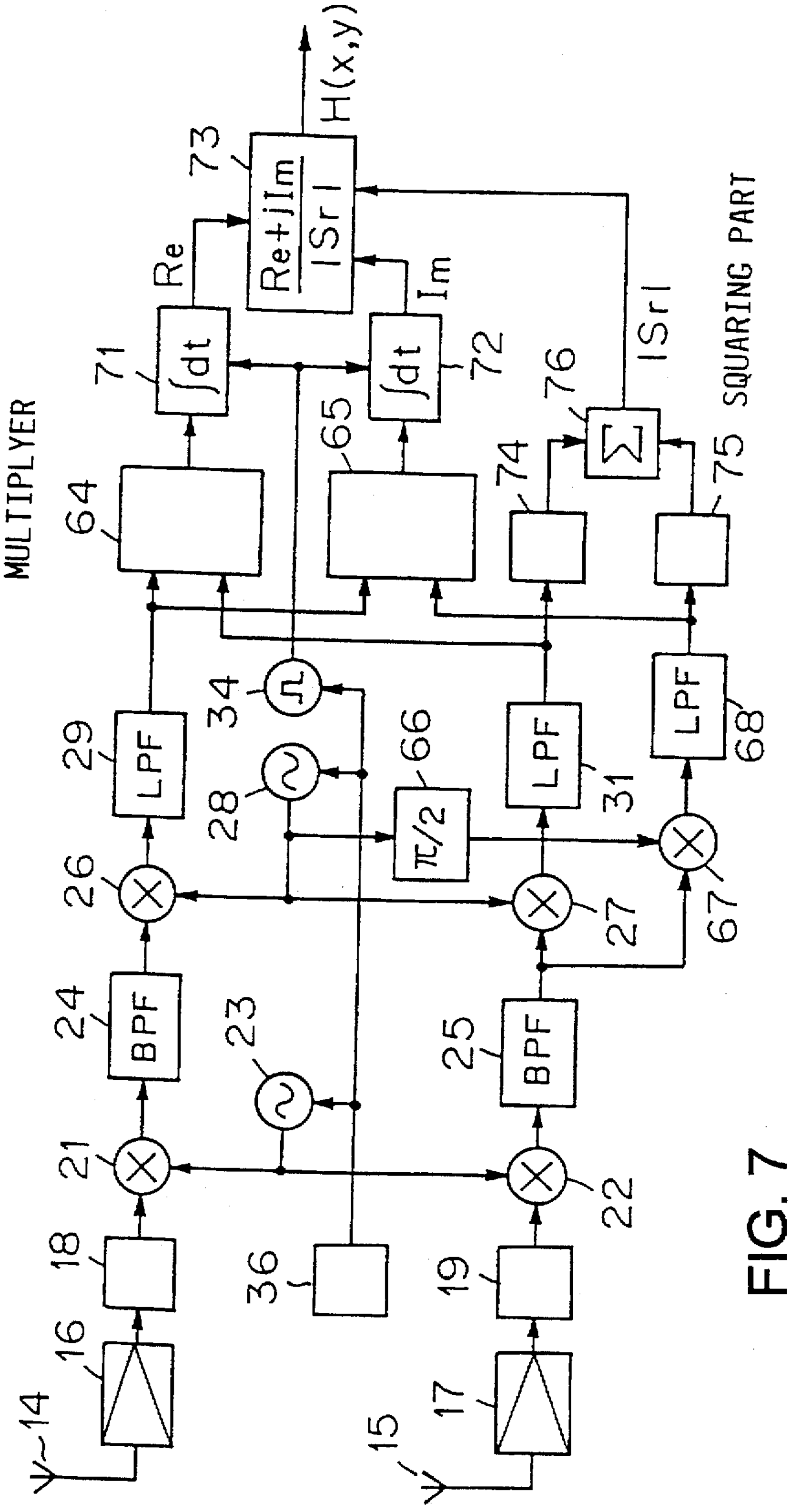
FIG. 7 is a block diagram showing another arrangement example for measuring two-dimensional interferogram data of waves in the method of the present invention.

In any one of the embodiments described above, the complex hologram (two-dimensional interferogram data) H(x,y) can also be obtained by the integration in the time region instead of in the spectrum region. This example is shown in FIG. 7 where the same reference symbols are assigned to the portions corresponding to those in FIG. 1. A base band signal from a low pass filter 29 is supplied to multipliers 64 and 65. On the other hand, the output of a band pass filter 25 of the fixed antenna 15 side which is a reference is multiplied in a multiplier 67 by an output of a local oscillator 28 shifted by π/2 in a phase shifter 66. A base band signal is taken out by a low pass filter 68 from the multiplied output. The outputs of the low pass filters 31 and 68 are supplied to multipliers 64 and 65 respectively. That is, the output of the band pass filter 25 is orthogonally detected or undergoes a quadrature-detection. The in-phase component and the quadrature component of the detected output are multiplied by the base band signal from the band pass filter 29 in the multipliers 64 and 65, respectively. The outputs of the multipliers 64 and 65 are sampled by the clock from the oscillator 34 in integrators 71 and 72, respectively, to form time series digital signals. Then, those signals are integrated in the time region and are supplied to a calculation part 73 as a real part $R_e$ and an imaginary part $I_m$, respectively. The outputs of the low pass filters 31 and 68 are branched respectively to squaring parts 74 and 75 and squared therein, respectively. Then, the squared signals are summed in a summing and square root extraction part 76. The summed result is square root extracted to obtain the magnitude of the received output $|S_r|$ of the fixed antenna and then supplied to the calculation part 73. In the calculation part 73, the calculation of $R_e+jI_m=S_m \cdot S_r{*}$ is performed and then this calculation result is divided by $|S_r|$ to obtain a radio wave hologram H(x,y).

Similarly, in any one of the aforementioned embodiments, a radio wave of circular polarization is radiated from the radiator 12. The horizontal polarized wave is received at the scanning antenna 14 and the fixed antenna 15 to obtain the radio wave hologram $H_H(x,y)$. The vertical polarized wave is also received to obtain the radio wave hologram $H_v(x,y)$. Then, complex weighing factors αH and αH are selected to obtain the radio wave hologram H'(x,y) of an arbitrary polarized wave by the following equation.

$$H'(x,y)=\alpha_H H_H(x,y)+\alpha_v H_v(x,y)$$

I(ξ,η) is found for H'(x,y) as mentioned above and the time response function of the propagation path is obtained. Then, the radio propagation simulation can be similarly obtained. Or, otherwise the position, the radiation strength and the phase of each wave source in the three-dimensional absolute coordinate are obtained and then a complex electric field E(x',y',z',ω) at an arbitrary position, or a mean delay $\tau_m$ of a radio wave from each wave source and its standard deviation $\tau_{rms}$ can be obtained. In this case, for the electric field strength inference, when the interferogram data obtained by the receiving of the horizontal polarized wave is $H_H(x,y)$, the interferogram data obtained by the receiving of the vertical polarized wave is $H_v(x,y)$, and the complex weighing factors are $\alpha_H$ and $\alpha_v$, the interferogram data H'(x,y) of an arbitrary polarized wave can be obtained by the following equation.

$$H'(x,y)=\alpha_H H_H(x,y)+\alpha_v H_v(x,y)$$

$\alpha_H$ and $\alpha_v$ are selected to obtain the desired interferogram data H'(x,y). Then, an electric field strength at an arbitrary position (x',y',z') could be obtained by reconstructing the secondary wave source image using the interferogram data.

Further, a receiving antenna directivity A(ξ,η) may be superposed on the receiving electric field strength at an arbitrary position (x',y',z') for weighted composition. That is, this result may be obtained by calculating the following equation.

$$E(x',y',z',\omega)=\Sigma\Sigma\{A(\xi,\eta)/\gamma(\xi,\eta)\}I'(\xi,\eta,\omega)exp\ [j\{\theta'(\xi,\eta,\omega)-2\pi\gamma'(\xi,\eta)/\lambda\}]$$

In the inference of the receiving electric field strength distribution, the result in which a space diversity is considered can easily be obtained. That is, the received output of the receiving diversity can be inferred by the composition of $E(x_1',y_1',z_1',\omega)$ and $E(x_2',y_2',z_2',\omega)$ or the selection of larger strength of the $E(x_1',y_1',z_1',\omega)$ and $E(x_2',y_2',z_2',\omega)$. That is, in the case of the composition, $E'(\gamma,\Delta,\gamma)=\alpha_1 E(x_1',y_1',z_1',\omega)+\alpha_2 E(x_2',y_2',z_2',\omega)$ is calculated. In this case, $\Delta\gamma=\sqrt{(x_1'-x_2')^2+(y_1'-y_2')^2+(z_1'-z_2')^2}$, $\gamma=(x_1,y_1,z_1)$, and $\alpha_1$, $\alpha_2$ are the complex weighing factors, respectively, which are determined such that the composite electric field strength E'(γ,Δγ) is optimized.

As the radiated radio waves $f_1$ and $f_2$, only the unique word portion from an actually operating radio station whose location is known may be taken out and utilized, or the switching information of a channel central frequency in the frequency hop TDMA may be utilized. That is, for example, since the code of the unique word portion is already known, the frequencies $f_1$, and $f_2$ of the modulation spectrum shift can be separately received and the respective interferogram data H(x,y) may be generated. In addition, the wave field strength inference method of the present invention can also be applied to the strength inference of each portion not only in radio propagation field but also in acoustic propagation field.

As mentioned above, according to the radio propagation simulation method of the present invention, the radio wave holograms on at least two frequencies are observed. For each of, for example, 4096 propagation paths, the amplitude and the delay (with PS resolution) of the received wave are found. Then, the time response function of each propagation path is found from the amplitude, the delay, and the receiving antenna characteristic. Since this time response function is convoluted into the modulated carrier wave signal, that is, since the time response function is obtained by an actual measurement, when, for example, the propagation path is separated into 4096 paths in the indoor region, several ten multi-paths existing within 1 ns of time duration can be separated even if many complex reflection objects are complicatedly arranged and many complex paths are generated. Also, in this case, the electric field distribution at the observation plane is accurately reflected and the time response function can be accurately found. Consequently, the radio propagation can be accurately simulated. Also, a simulation as to what a receiving demodulated signal is obtained can be performed. For example, the present invention can be applied to the simulation of a high speed wireless LAN (19 GHz band, 200 Mbps) including the antenna system and the modulation/demodulation system.

According to the wave field strength inference method of the present invention, secondary wave sources are reconstructed from wave interferogram data (complex hologram). These wave sources are re-positioned in a three-dimensional absolute space and these waves are composited at an arbitrary position to infer the strength and the phase. Therefore, each position is not necessary to be measured by a sensor and there is no influence by the sensor moving equipment. Consequently, the precise inference of the wave field distribution can be performed.

In addition, a transmitted radio wave in an existing communication system (e.g., transmitted unique word) can be utilized to measure the electric field distribution in the radio propagation space of the communication system. When changes in configuration or other changes such as a construction/demolition of a building occur in the radio propagation space after the start of the communication system, it is possible to measure the change of the electric field distribution and to improve the failure state of the communication system by following the change.

According to the three-dimensional delay spread inference method of the present invention, the interferogram data (complex hologram) are observed, the wave source images are reconstructed and are re-positioned in a three-dimensional absolute space. Since the attenuation and the delay in accordance with the distance between each wave source and an arbitrary position which can be viewed from the hologram observation plane are found to obtain a mean delay $\tau_m$ and standard delay deviation $\tau_{rms}$, those values can be obtained simply and in short time compared with the prior art in which a receiver is moved to the respective positions to be measured. In addition, in the case of the present invention, no special modulation is necessary. Therefore, the measurement can be performed in a narrow band and a short delay can also be separated.

What is claimed is:

1. A radio propagation simulation method wherein two-dimensional interferogram data of a wave is measured with respect to a plurality of frequencies to simulate the propagation thereof, said method comprising:

a first step for measuring two-dimensional interferogram data of a radio wave with respect to a plurality of frequencies in a subject space;

a second step for reconstructing radio wave source images from said measured two-dimensional interferogram data with respect to the plurality of frequencies;

a third step for generating a time response function of the propagation path of the wave based on the amplitude and delay of each of said reconstructed wave source images as well as the directivity characteristic of the receiving antenna;

a fourth step for convoluting the generated time response function into a modulated carrier wave signal; and a fifth step for demodulating a received base band signal from the convoluted result in said fourth step.

2. The radio propagation simulation method according to claim 1, wherein said third step comprises:

a sixth step for finding a frequency selective fading characteristic based on the amplitude, the delay and the directivity characteristic of the receiving antenna; and a seventh step for effecting an inverse Fourier transformation of said frequency selective fading characteristic with the frequency band to be found.

3. The radio propagation simulation method according to claim 2, wherein said seventh step is performed by shifting said frequency band to be found toward lower frequency side by a predetermined value as well as shifting the frequency axis of said frequency selective fading characteristic toward higher frequency side by said predetermined value.

4. The radio propagation simulation method according to claim 1, wherein said third step finds an impulse response in which the amplitude, the delay and the directivity characteristic of the receiving antenna are superposed.

5. The radio propagation simulation method according to claim 4, wherein said fourth step comprises:

a step for finding a timing having a significant value of said time response function obtained in said step 3, and a calculation timing; and a step for shifting the phase of said time response function in said fourth step in accordance with the difference between both the timings found in the above step.

6. The radio propagation simulation method according to any one of claims 1 to 5, wherein said fourth step comprises:

an eighth step for convoluting the real part of said time response function into said modulated carrier wave signal; and a ninth step for convoluting the imaginary part of said time response function into said modulated carrier wave signal.

7. The radio propagation simulation method according to claim 6, wherein said fourth step comprises:

a step for multiplying the convoluted result of said eighth step by a high frequency signal which is the difference between a carrier frequency and an intermediate frequency;

a step for multiplying the convoluted result of said ninth step by said high frequency signal and a high frequency signal having a phase shifted by $\pi/2$ relative to said high frequency signal; and a step for summing both the multiplied results.

8. The radio propagation simulation method according to claim 6, wherein said fourth step comprises:

a step for effecting Hilbert transformation of said time response function;

a step for convoluting the real part of the Hilbert transformed function into said modulated carrier wave signal; and a step for convoluting the imaginary part of the Hilbert transformed function into said modulated carrier wave signal.

9. A wave field strength inference method wherein two-dimensional interferogram data of a wave is measured with respect to a plurality of frequencies to infer a field strength of the wave, said method comprising:

a first step for measuring two-dimensional interferogram data of a radio wave with respect to a plurality of frequencies at a position where a primary wave source can be viewed therefrom and where a subject wave field space to be inferred can be looked out;

a second step for reconstructing wave source images from the measured two-dimensional interferogram data with respect to the plurality of frequencies;

a third step for finding a propagation delay time of each of said reconstructed wave source images relative to the primary wave source based on the phase of the primary wave source;

a fourth step for re-positioning each of the wave source images in a three-dimensional absolute coordinate using the reconstructed associated wave source image, the associated propagation delay, and the phase of the wave source observed by a frequency to be inferred; and a fifth step for inferring a field strength of the wave by composing the radiated waves from the respective re-positioned wave source images at an arbitrary position in said three-dimensional absolute coordinate.

10. The wave field strength inference method according to claim 9, wherein said primary wave source is used as a transmitter in an existing radio communication system, and the measurement of said two-dimensional interferogram data is performed with respect to a radio wave having a known modulating signal among radio waves transmitted from said transmitter.

11. A three-dimensional delay spread inference method wherein two-dimensional interferogram data of a wave is measured with respect to a plurality of frequencies to infer a three-dimensional delay spread of the wave, said method comprising:

a first step for measuring two-dimensional interferogram data of a radio wave with respect to a plurality of frequencies at a position where a primary wave source can be viewed therefrom and where a subject electric field space can be looked out;

a second step for reconstructing wave source images from the measured interferogram data with respect to the plurality of frequencies;

a third step for finding a propagation delay time of each of said reconstructed wave source images relative to the primary wave source based on the phase of the primary wave source;

a fourth step for re-positioning each of the wave source images in a three-dimensional absolute coordinate using the reconstructed associated wave source image, the associated propagation delay, and the phase of the wave source observed by a frequency to be inferred; and a fifth step for finding delay times and strength attenuation amounts depending on the distances to each of the re-positioned wave source images at an arbitrary position in said three-dimensional absolute coordinate to calculate a mean value of the delays and a standard deviation of the delays.

12. The three-dimensional delay spread inference method according to claim 11, wherein the frequency band of said radio wave is limited, and in said fifth step, assuming that the strength and the phase of each of said re-positioned wave source images are constant in the limited frequency band, a frequency response function of a propagation path based on the associated delay time and strength attenuation amount is found, and the frequency response function is transformed into a time response function from which function are calculated said mean value of the delays and said standard deviation of the delays.

* * * * *